US00RE41055E

(19) United States
(12) Reissued Patent
Choke-arpornchai et al.

(10) Patent Number: US RE41,055 E
(45) Date of Reissued Patent: Dec. 29, 2009

(54) BOTTLE

(75) Inventors: Bunchorn Choke-arpornchai, Samutprakarn (TH); Nittayanun Korprasert, Bangkok (TH); Chadaporn Kusumarn, Bangkok (TH)

(73) Assignee: S.C. Johnson & Son, Inc., Racine, WI (US)

(21) Appl. No.: 29/256,632

(22) Filed: Mar. 22, 2006

Related U.S. Patent Documents

Reissue of:
(64) Patent No.: Des. 480,309
Issued: Oct. 7, 2003
Appl. No.: 29/159,067
Filed: Apr. 12, 2002

(51) LOC (9) Cl. ..... 09-01
(52) U.S. Cl. ..... D9/522; D9/565; D9/516; D9/575
(58) Field of Classification Search ..... None
See application file for complete search history.

(56) References Cited

U.S. PATENT DOCUMENTS

| | | | | | |
|---|---|---|---|---|---|
| D54,463 | S | * | 2/1920 | Scott | D9/765 |
| D69,486 | S | * | 2/1926 | Braun | D9/545 |
| D86,724 | S | * | 4/1932 | Joseph | D9/529 |
| D93,063 | S | * | 8/1934 | Westlake | D9/544 |
| D118,381 | S | * | 1/1940 | McIntosh | D9/562 |
| D284,352 | S | * | 6/1986 | Thompson | D9/520 |
| D362,624 | S | * | 9/1995 | Vignot | D9/520 |
| D386,974 | S | * | 12/1997 | Wefler | D9/569 |
| D422,507 | S | * | 4/2000 | Luzzi et al. | D9/544 |
| D439,319 | S | * | 3/2001 | Wolpert | D23/363 |
| D453,110 | S | * | 1/2002 | Bulsink | D9/522 |
| D454,628 | S | * | 3/2002 | Basaganas | D23/366 |

OTHER PUBLICATIONS

Hecht's Gifts Especially for You, Holiday Gifts, "Parfumes Joopi", Printed by Hecht Co., VA.*
Commercial Perfume Bottles, by Jacquelyn Y. Jones–North, Schiffer Pub. Co., Ltd, PA, ® 1987, #361, p. 123, bottom right of page.*
Commercial Perfume Bottles, by Jacquelyn Y. Jones–North, Schiffer Pub. Co., Ltd, PA ® 1987, #538, p. 159, Elizabeth Arden launch of "My Love", 1949, left side of page.*

* cited by examiner

*Primary Examiner*—Carol Rademaker

(57) CLAIM

The ornamental design for a bottle, as shown and described.

DESCRIPTION

FIG. 1 is a front perspective view from above and to one side of the bottles showing the new design.
FIG. 2 is a front view of the bottle of FIG. 1.
FIG. 3 is a rear view of the bottle of FIG. 1.
FIG. 4 is a right side view of the bottle of FIG.1, the left side being a mirror image thereof.
FIG. 5 is a top plan view of the bottle of FIG. 1; and,
FIG. 6 is a bottom plan view of the bottle of FIG. 1.
The broken line showing in FIG. 3 is for illustrative purposes only and forms no part of the claimed design.

1 Claim, 1 Drawing Sheet

Figure 1:
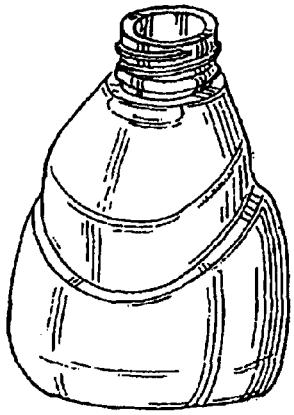
Figure 2:
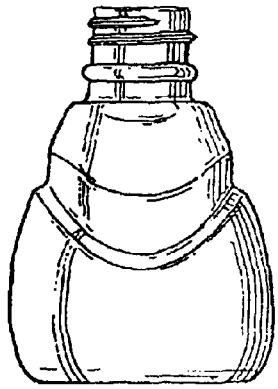
Figure 3:
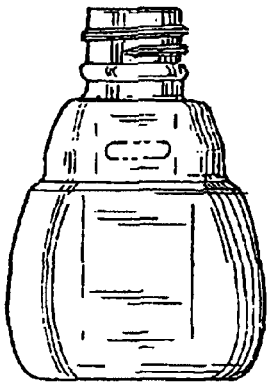
Figure 4:
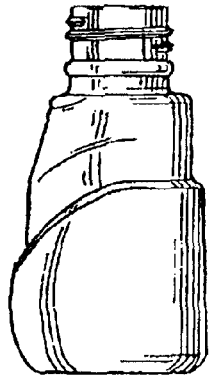
Figure 5:
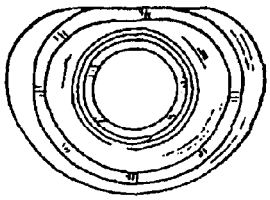
Figure 6:
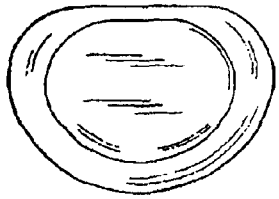

Matter enclosed in heavy brackets [ ] appears in the original patent, but forms no part of this reissue; matter printed in italics indicates the additions made by reissue.